US008566953B2

(12) United States Patent
Campbell et al.

(10) Patent No.: US 8,566,953 B2
(45) Date of Patent: Oct. 22, 2013

(54) NAMED OBJECT VIEW OF ELECTRONIC DATA REPORT (75) Inventors: John Campbell, Renton, WA (US); Boaz Chen, Redmond, WA (US); Daniel Battagin, Bellevue, WA (US); Eran Megiddo, Bellevue, WA (US); Yariv Ben-Tovim, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1166 days.

(21) Appl. No.: 11/860,394

(22) Filed: Sep. 24, 2007

(65) Prior Publication Data
US 2008/0010670 A1 Jan. 10, 2008

Related U.S. Application Data (63) Continuation-in-part of application No. 11/223,541, filed on Sep. 9, 2005.

(51) Int. Cl.
*G06F 21/00* (2013.01)

(52) U.S. Cl.
USPC ............... 726/28; 726/27; 726/29; 726/30; 726/31; 726/2; 726/12; 726/13; 726/14; 726/15; 726/16; 726/17; 713/165; 713/166; 713/167; 713/182; 713/183; 713/184; 713/185; 713/186; 709/225; 709/229

(58) Field of Classification Search
USPC ........... 726/26–33, 2–6, 12–17; 713/164–167
See application file for complete search history.

(56) References Cited

U.S. PATENT DOCUMENTS

| 5,339,392 | A | | 8/1994 | Risberg et al. ................ 395/161 |
| 5,423,034 | A | * | 6/1995 | Cohen-Levy et al. ................ 1/1 |
| 5,452,447 | A | * | 9/1995 | Nelson et al. ......................... 1/1 |
| 5,613,058 | A | | 3/1997 | Koppolu et al. ............... 715/744 |
| 5,852,439 | A | | 12/1998 | Musgrove et al. ............. 345/339 |
| 5,893,125 | A | | 4/1999 | Shostak ........................ 707/511 |
| 5,978,818 | A | | 11/1999 | Lin .......................... 715/209 |
| 6,199,099 | B1 | | 3/2001 | Gershman et al. ............ 709/203 |
| 6,269,403 | B1 | | 7/2001 | Anders ......................... 709/231 |

(Continued)

FOREIGN PATENT DOCUMENTS

| AU | 2006291313 | 7/2001 |
| EP | 0798655 | 1/1997 |

(Continued)

OTHER PUBLICATIONS

PCT Search Report dated Oct. 25, 2012 in Appln No. PCT/US2012/026672.

(Continued)

*Primary Examiner* — David Pearson
*Assistant Examiner* — Josnel Jeudy
(74) *Attorney, Agent, or Firm* — Merchant & Gould (57) ABSTRACT A named object view of a report is generated from an electronic data file. Objects in the file to be published are identified in the file. A named object view of the report associated with the file is generated by displaying published identified objects according to associated viewing rights. A viewer at a client is presented with the named object view of the report, according to the viewing rights, such that the viewer's attention is focused on the published objects.

20 Claims, 7 Drawing Sheets

(56) References Cited

U.S. PATENT DOCUMENTS

| | | | |
|---|---|---|---|
| 6,298,334 B1 | 10/2001 | Burfield et al. | 705/36 |
| 6,501,491 B1 | 12/2002 | Brown et al. | 345/853 |
| 6,507,865 B1 | 1/2003 | Hanson et al. | 709/206 |
| 6,613,098 B1 | 9/2003 | Sorge et al. | |
| 6,625,603 B1* | 9/2003 | Garg et al. | 707/758 |
| 6,626,959 B1 | 9/2003 | Moise et al. | |
| 6,631,498 B1 | 10/2003 | McCauley et al. | 715/517 |
| 6,632,249 B2 | 10/2003 | Pollock | 715/513 |
| 6,662,341 B1 | 12/2003 | Cooper et al. | 715/513 |
| 6,691,100 B1 | 2/2004 | Alavi et al. | |
| 6,701,485 B1 | 3/2004 | Igra et al. | 715/210 |
| 6,832,351 B1 | 12/2004 | Batres | 715/505 |
| 6,988,241 B1 | 1/2006 | Guttman et al. | |
| 7,015,911 B2 | 3/2006 | Shaughnessy et al. | 345/440 |
| 7,031,979 B2 | 4/2006 | Kauffman | |
| 7,231,657 B2* | 6/2007 | Honarvar et al. | 726/2 |
| 7,640,469 B2 | 12/2009 | Chaulk et al. | 715/243 |
| 7,650,644 B2* | 1/2010 | Cheng et al. | 726/27 |
| 2002/0065846 A1 | 5/2002 | Ogawa et al. | |
| 2002/0077803 A1* | 6/2002 | Kudoh et al. | 704/1 |
| 2002/0113822 A1 | 8/2002 | Windl et al. | 345/769 |
| 2002/0158887 A1 | 10/2002 | Samra et al. | 345/619 |
| 2003/0044762 A1* | 3/2003 | Bergan et al. | 434/350 |
| 2003/0051209 A1 | 3/2003 | Androski et al. | 715/503 |
| 2003/0061305 A1 | 3/2003 | Copley et al. | 709/217 |
| 2003/0088586 A1 | 5/2003 | Fitzpatrick et al. | |
| 2003/0105765 A1 | 6/2003 | Smith et al. | 707/100 |
| 2003/0212960 A1 | 11/2003 | Shaughnessy et al. | |
| 2003/0226105 A1 | 12/2003 | Waldau | 715/503 |
| 2004/0003353 A1* | 1/2004 | Rivera et al. | 715/530 |
| 2004/0006539 A1 | 1/2004 | Royer et al. | |
| 2004/0015783 A1 | 1/2004 | Lennon et al. | |
| 2004/0117731 A1 | 6/2004 | Blyashov | 715/507 |
| 2004/0143788 A1 | 7/2004 | Aureglia et al. | 715/503 |
| 2004/0181748 A1 | 9/2004 | Jamshidi et al. | |
| 2004/0199867 A1* | 10/2004 | Brandenborg | 715/500.1 |
| 2004/0268364 A1 | 12/2004 | Faraj | 719/316 |
| 2005/0102608 A1 | 5/2005 | Batres | 715/505 |
| 2007/0061699 A1 | 3/2007 | Battagin et al. | 715/209 |
| 2007/0130517 A1 | 6/2007 | Wu | 715/530 |
| 2008/0046803 A1 | 2/2008 | Beauchamp et al. | |
| 2011/0145689 A1 | 6/2011 | Campbell et al. | |

FOREIGN PATENT DOCUMENTS

| | | |
|---|---|---|
| EP | 1 367 514 | 3/2003 |
| EP | 1 603 053 A2 | 7/2005 |
| JP | 8-500200 | 1/1996 |
| JP | 2001-109741 | 4/2001 |
| JP | 2001-312442 | 11/2001 |
| JP | 2003-108440 | 4/2003 |
| JP | 2003-281128 | 10/2003 |
| JP | 2004-145713 | 5/2004 |
| MX | 278251 | 8/2010 |
| RU | 2 390 834 C2 | 5/2010 |
| RU | 2 419 853 | 5/2011 |
| SG | 117587 | 12/2007 |
| WO | WO 00/72197 A2 | 11/2000 |
| WO | WO 02/03595 | 1/2002 |
| WO | WO 2007/032907 A1 | 3/2007 |

OTHER PUBLICATIONS

U.S. Appl. No. 13/035,689, filed Feb. 25, 2011 entitled "Names Object View Over Multiple Files".
Office Action dated Mar. 2, 2011, issued in U.S. Appl. No. 11/223,541.
Brain Matter [Online], AlphaBlox, Apr. 5, 2001 [Retrieved on Sep. 7, 2006]. Retrieved from <URL:http://web.archive.org/web/20010405152714/www.blox.com/?id=sheet>.
Brain Matter [Online], AlphaBlox, Jul. 22, 2001 [Retrieved on Sep. 7, 2006]. Retrieved from <URL:http://web.archive.org/web/20010818124342/www.blox.com/products?subsection=spreadhseets>.
Curie, D., "The Medium Is The Message: Data Downlink's.xls Lets Number Stay Numbers," Online, Nov.-Dec. 1997, vol. 21, No. 6, p. 64, 66.
Levin, Carol, "Skinny Clients To Rule On Web—Corporate Intranets Will Fuel A New Breed of Applications," PC Magazine, Mar. 26, 1996, vol. 15, No. 6, p. 37.
McManus, Sean, "Excel Everywhere for HTML: Transform Static Excel Spreadsheets Into Smart Interactive Web Pages," Internet Magazine, Mar. 2004, No. 115, p. 106.
Pembudon et al., XHTML 1.0: The Extensible Hypertext Markup Language, A Reformulation of HTML-4.0 in XML 1.0, W3C Working Draft, May 5, 1999, http://www.w3.org/TR/1999/xhtml1-199990505/.
Powell, Jim, "Add-Ins Turn App Docs Into Web Pages: Microsoft Internet Assistant Tools," Windows Magazine, Jun. 1, 1996, vol. 7, No. 6, p. 120.
Stinson, C., Microsoft Office Excel 2003, Sep. 3, 2003, Microsoft Press, pp. 1-7.
Zhao, J.J., "Developing Web-Enabled Interactive Financial Tools Without HTML and Script Languages," Information Technology, Learning, and Performance Journal, Fall 2001, vol. 19, No. 2, p. 49-53.
New Zealand Examination Report cited in Appln No. 540420 dated Jun. 7, 2005.
Australian Examination Report dated May 29, 2007, cited in Appln No. SG 200503164-6 dated May 29, 2007.
International Search Report dated Aug. 21, 2007, issued in EP 05104560; 3 pgs.
Chinese Office Action cited in Appln No. 200510075819.5 dated Jan. 14, 2008.
Chilean Office Action cited in Appln No. 1155-2005 dated Jan. 16, 2008.
European Office Action cited in Appln No. 05 104 560.7-1527 dated Jun. 9, 2008.
Chinese Second Office Action cited in Appln No. 200510075819.5 dated Jun. 18, 2008.
Chinese Third Office Action cited in Appln No. 200510075819.5 dated Nov. 7, 2008.
Mexican Office Action cited in Appl No. PA/a/2005/005855, dated Apr. 21, 2009.
Russian Office Action cited in Appln No. 2005116667 dated Apr. 24, 2009.
Chilean Second Office Action cited in Appln No. 1155-2005 dated Jun. 23, 2009.
Israeli Office Action cited in Appln No. 168621 dated Sep. 22, 2009.
Mexican Second Office Action cited in Appl No. PA/a/2005/005855, dated Nov. 18, 2009.
Chilean Third Office Action cited in Appln No. 1155-2005 dated Jun. 8, 2010.
Mexican Office Action cited in Appl No. MX/a/2008/03318, dated Aug. 17, 2010, 3 pgs.
Malaysian Office Action cited in Appl No. PI 20052416, dated Sep. 15, 2010.
Notice of Rejection in Appln No. 2005-161206 dated Oct. 22, 2010.
Office Action dated May 15, 2006, issued in U.S. Appl. No. 10/858,188.
Office Action dated Nov. 21, 2006, issued in U.S. Appl. No. 10/858,188.
Office Action dated Jul. 6, 2007, issued in U.S. Appl. No. 10/858,188.
Office Action dated Feb. 20, 2008, issued in U.S. Appl. No. 10/858,188.
Office Action dated Oct. 29, 2008, issued in U.S. Appl. No. 10/858,188.
Office Action dated Jun. 23, 2011, issued in U.S. Appl. No. 11/223,541.
Office Action dated Sep. 25, 2012, issued in U.S. Appl. No. 11/223,541.
"Object Lens: A Spreadsheet for Cooperative Work; Abstract," by Kum-Yew Lai, et al., Sep. 1988, Retrieved from the Internet: https://hpds1.mit.edu/bitstream/1721.1/2210/1/SWP-2053-21290214.pdf, Retrieved on Dec. 12, 2005, 42 pgs.
"Welcome to Gnumeric!" Retrieved from the Internet: http://www.gnome.org/projects/gnumeric/, Retrieved on Dec. 12, 2005, 2 pgs.

(56) References Cited

OTHER PUBLICATIONS

"XESS The Advanced X Windows Spreadsheet System," Retrieved from the Internet: http://www.ais.com/Xess/xess5_product_sheet.html, Retrieved on Dec. 12, 2005, 3 pgs.
"How To: Save a Workbook as a Web Page in Excel 2002; Summary," Retrieved from the Internet: http://support.microsoft.com/default.aspx?scid=kb;en-us;289260, Retrieved on Dec. 12, 2005, 3 pgs.
International Search Report dated Jan. 8, 2007, issued in PCT Application No. PCT/US2006/033800; 2 pgs.
Office Action dated Nov. 19, 2008, issued in U.S. Appl. No. 11/223,541.
Office Action dated May 26, 2009, issued in U.S. Appl. No. 11/223,541.
Office Action dated Jan. 20, 2010, issued in U.S. Appl. No. 11/223,541.
Blattner, "Special Edition Using Microsoft Excel 2003"; Que, published Sep. 11, 2003, pp. 16, 47-51, 350-369 and 445-447, 30 pgs.
Office Action dated Sep. 15, 2010, issued in U.S. Appl. No. 11/223,541.
Office Action dated Oct. 7, 2011, issued in U.S. Appl. No. 11/223,541.
Japanese Notice of Rejection cited in Appln No. 2008-530095 dated Jan. 31, 2012.
"Data Warehouse Trend, Part 2 OLAP is enabled on WWW Browser, formulation/operation of data warehouse becomes easy and enlargement of user target is accelerated"; Nikkei Computer, No. 440, pp. 224-227; Nikkei Business Publications, Inc., Japan, Mar. 30, 1998.
Office Action dated Apr. 30, 2012, issued in U.S. Appl. No. 11/223,541.
Person, R.; "Special Edition Using Microsoft Excel '97"; © 1997 Que Corp., pp. 385-410 (cited in Apr. 22, 2013 OA).
Office Action dated Apr. 22, 2013, issued in U.S. Appl. No. 11/223,541.

* cited by examiner

Fig. 7

NAMED OBJECT VIEW OF ELECTRONIC DATA REPORT

RELATED APPLICATION

This application claims the benefit under 35 U.S.C. 120 of U.S. patent application Ser. No. 11/223,541 filed on Sep. 9, 2005.

BACKGROUND

Electronic document sharing allows multiple users to access the same document. Some documents, such as spreadsheets, may include multiple sheets with each sheet including a large amount of data. A report may be generated from the document to present the data in an organized format. However, the report may confuse viewers if the report contains too much data. A viewer may need to search through the report to locate desired information, which can be laborious and time consuming. Also, electronic documents typically include security at a file level thereby allowing access to the entire file or denying access to the entire file. Such security may be under inclusive and over inclusive and not represent the desired security for objects of the electronic document.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter.

Aspects of the disclosure include a named object view of a report that is generated from an electronic data file. Objects in the file to be published are identified in the file. A named object view of the report associated with the file is generated by displaying published identified objects. A viewer at a client is presented with the named object view of the report, such that the viewer's attention is focused on the published objects.

Other aspects of the disclosure include named object view of a report that is generated from an electronic data file. Objects in the file to be published are identified in the file. A named object view of the report associated with the file is generated by displaying published identified objects according to associated viewing rights. A viewer at a client is presented with the named object view of the report, according to the viewing rights, such that the viewer's attention is focused on the published objects with access rights.

Aspects may include a computer process, a computing system, or an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive aspects are described with reference to the following figures.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system. Accordingly, the logical operations making up the embodiments described herein are referred to alternatively as operations, steps or modules.

Figure 1:
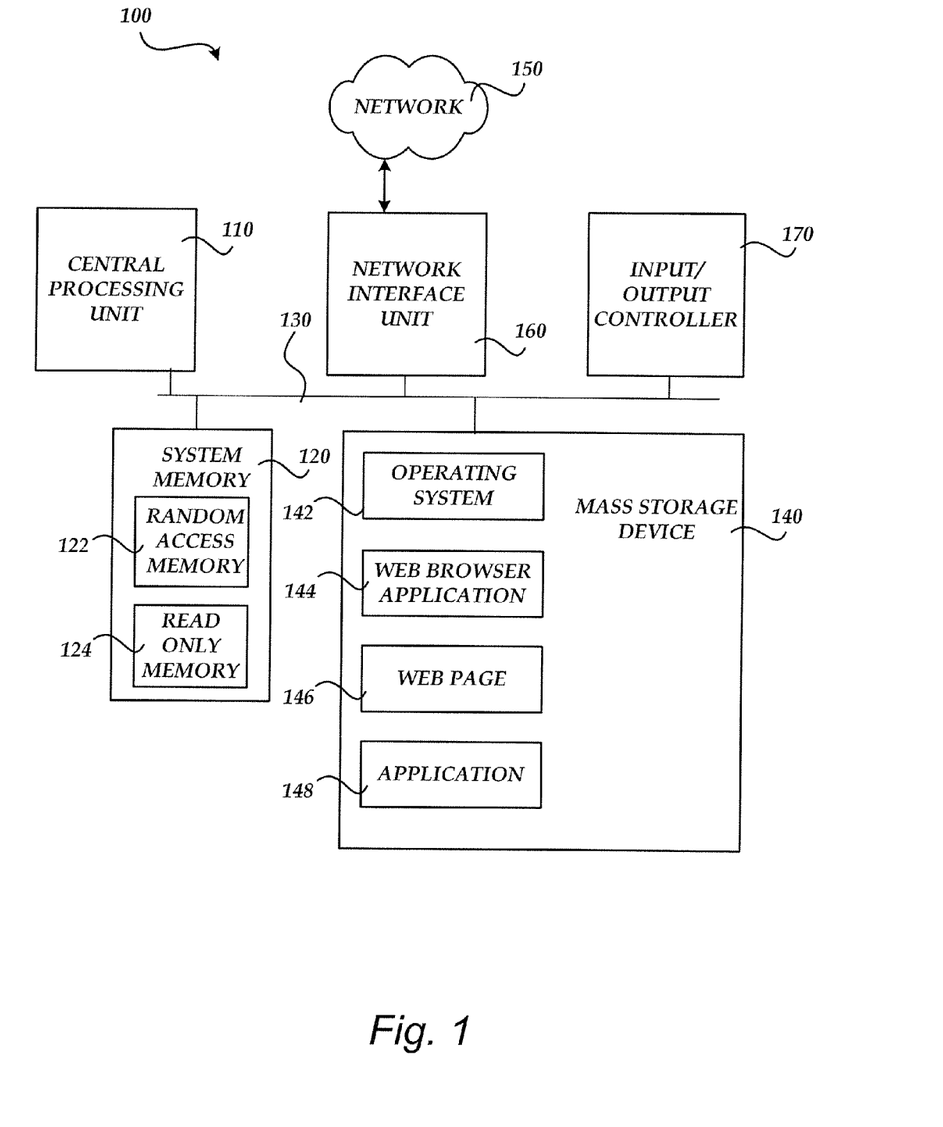
FIG. 1 is an exemplary computer system architecture diagram illustrating a computer system.

FIG. 1 and the corresponding discussion are intended to provide a brief, general description of a suitable computing environment. While described in the general context of program modules that execute on server and personal computer systems, other types of computer systems and program modules may be included.

Generally, program modules include routines, programs, components, data structures, and other types of structures that perform particular tasks or implement particular abstract data types. Moreover, the disclosure may be implemented with other computer system configurations, including hand-held devices, multiprocessor systems, microprocessor-based or programmable consumer electronics, minicomputers, mainframe computers, and the like. The disclosure may also be implemented in distributed computing environments where tasks are performed by remote processing devices that are linked through a communications network. In a distributed computing environment, program modules may be located in both local and remote memory storage devices.

The computer architecture shown in FIG. 1 illustrates a desktop or laptop computer, including a central processing unit 110 ("CPU"), a system memory 120, including a random access memory ("RAM") 122 and a read-only memory ("ROM") 124, and a system bus 130 that couples the memory to the CPU 110. A basic input/output system containing the basic routines that help to transfer information between elements within the computer, such as during startup, is stored in the ROM 124. The computer 100 further includes a mass storage device 140 for storing an operating system 142, application programs, and other program modules, which will be described in greater detail below.

The mass storage device 140 is connected to the CPU 110 through a mass storage controller (not shown) connected to the bus 130. The mass storage device 140 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various aspects of the disclosure, the computer 100 may operate in a networked environment using logical connections to remote computers through a network 150, such as the Internet. The computer 100 may connect to the network 150 through a network interface unit 160 connected to the bus 130. It should be appreciated that the network interface unit 160 may also be utilized to connect to other types of networks and remote computer systems. The computer 100 may also include an input/output controller 170 for receiving and processing input from a number of other devices, including a keyboard, mouse, or electronic stylus (not shown in FIG. 1). Similarly, the input/output controller 170 may provide output to a display screen, a printer, or other type of output device.

As mentioned briefly above, a number of program modules and data files may be stored in the mass storage device 140 and RAM 122 of the computer 100, including the operating system 142 that is suitable for controlling the operation of a networked personal computer. The mass storage device 140 and the RAM 122 may also store one or more program modules. In particular, the mass storage device 140 and the RAM 122 may store a web browser application program 144. The web browser application program 144 is operative to request, receive, render, and provide interactivity with electronic documents, such as a web page 146 that has been formatted using a mark-up language ("ML") such as HTML or XML.

As will be described in greater detail below, the web page 146 may comprise a named object view of a report associated with electronic data from an application program 148. The application program 148 may include a spreadsheet application program. It should be appreciated that although some embodiments described herein are presented in the context of a spreadsheet application program other types of application programs that support electronic data reporting are contemplated. For instance, embodiments may include a word processing application program, a presentation application program, a drawing or computer-aided design application program, or a database application program in order to allow the rendering of and interaction with a document without requiring a dedicated application program. Additional details regarding the process for generating a named object view of a report are provided below with respect to FIGS. 2-7.

Figure 2:
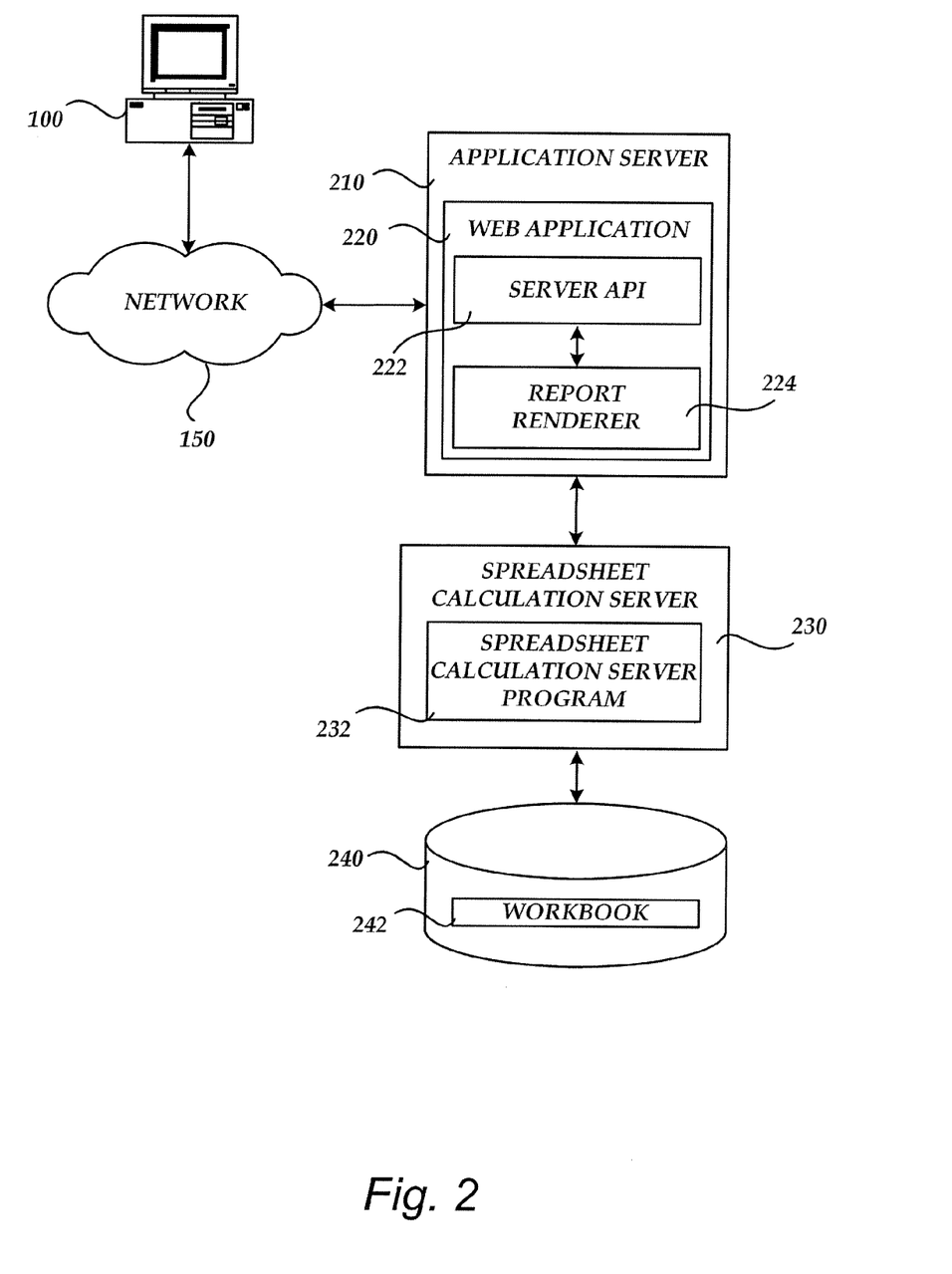
FIG. 2 is an exemplary network architecture diagram illustrating an illustrative operating environment.

As shown in FIG. 2, the computer 100 is connected to the network 150. Also connected to the network 150 is an application server 210. The application server 210 comprises a server computer which may contain some or all of the conventional computing components described above with respect to FIG. 1. Additionally, the application server 210 is operative to execute a web server application for receiving and responding to requests for documents stored at or accessible to the application server 210. Moreover, the application server 210 is operative to receive and respond to requests for pages generated by a web application 220. It should be appreciated that the web application 220 may comprise code executable at the application server 210, executable code for communicating with other computers, and may include templates, graphics, audio files, and other content.

The web application 220 is operative to provide an interface to a user of the computer 100 to view a named object view of a report associated with electronic data accessible via the network 150. In particular, the web application 220 utilizes a server application programming interface ("API") 222. The server API 222 may be operative to enable communication with a spreadsheet calculation server 230. The spreadsheet calculation server 230 is operative to execute a spreadsheet calculation server program 232. The spreadsheet calculation server program 232 comprises an executable program for retrieving and calculating a named object view of a report associated with electronic data. The electronic data may be any file such as a workbook 242 stored in a data store 240. The spreadsheet calculation server 230 may include many of the conventional hardware and software components discussed above with respect to FIG. 1.

The computer 100 may transmit a request to the application server 210 for a named object view of a report of the workbook 242 within the context of the web browser application 144. In response to such a request, the web application 220 communicates with the spreadsheet calculation server 230 through the server API 222. In particular, the web application 220 requests from the spreadsheet calculation server 230 the requested named object view of the report.

The spreadsheet calculation server program 232 loads the appropriate workbook 242 from the data store 240 and processes the workbook 242. The workbook 242 is processed as discussed in detail below. Briefly, the spreadsheet calculation server 230 identifies the objects to be published in the workbook 242. The spreadsheet calculation server 230 generates the named object view of the report associated with the workbook 242 by publishing the identified objects. The report renderer 224 converts the published objects into ML such that each object that is identified for publishing may be individually rendered by the web application 220. The application server 210 forwards the ML version of the published objects to the client 100 for display by a web browser via the network 150. A user at the client 100 may then view the published objects of the workbook 242.

In another aspect, an author and/or administrator of workbook 242 may set rights associated with the objects of workbook 242. The rights may include an access right, a no access right, a write access right, a read access right, an edit access right and/or any other type of right or security for securing objects. The viewer rights may be associated with a specific viewer identifier and/or a group identifier associated with a plurality of viewers. In one aspect, the viewer identifier and/or group identifier is an identifier associated with a document management server or user management server. In this manner, an author and/or administrator may easily set rights for objects of workbook 242 below the file level. In one aspect, the rights are associated with the objects generated from the data of workbook 242. The data of workbook 242 may include a different set of rights that are separate from the rights of the objects generated from the data. The data of workbook 242 may include no access rights for any viewer except for the author. The objects generated from the data of workbook 242 may include a combination of access rights depending of the rights granted to a particular viewer. As an example, an author/administrator may grant no rights to the data of workbook 242 and grant an access right to a pivot table object, generated from the data in the workbook, to a first viewer and grant no access rights to a chart object, generated from the data in the workbook, to the first viewer.

Continuing with the above example, the computer 100 may transmit a request to the application server 210 for a named object view of a report of the workbook 242 within the context of the web browser application 144. The request may include an associated viewer identifier and/or group identifier. In response to such a request, the web application 220 communicates with the spreadsheet calculation server 230 through the server API 222. In particular, the web application 220 requests from the spreadsheet calculation server 230 the requested named object view of the report.

The spreadsheet calculation server program 232 loads the appropriate workbook 242 from the data store 240 and processes the workbook 242. The spreadsheet calculation server 230 identifies the objects to be published in the workbook 242. The spreadsheet calculation server 230 generates the named object view of the report associated with the workbook 242 by generating the named object view based on the file publication. The report renderer 224 determines whether the objects include security rights. The security rights are identified by a viewer identifier and/or group identifier associated with the objects of workbook 242. The viewer identifier and/or group identifier associated with the request is compared to the security rights of the objects to determine whether to grant access. When the requesting viewer has access rights to the object, the report renderer 224 converts the published objects into ML such that each object that is identified for publishing and has the appropriate rights for the requesting viewer may be individually rendered by the web application 220. The application server 210 forwards the ML version of the published objects to the client 100 for display by a web browser via the network 150. A viewer at the client 100 may then view the accessible published objects of the workbook 242.

In other aspects, a viewer at client 100 may associate a link to the object, such as a resource identifier, in another client application that has a hosted web render. The client application may be an application apart from a web browser. The object renders in the client applicant and the viewer may interact with the object. Such interaction may include manipulating the object, changing fields of the object and other types of interaction that is typically association with a spreadsheet application. When interacting, the ML associated with the object is refreshed on the client application by a session identifier and communication between the hosted web render of the client application and application server 210. In this manner, the viewer may interact with the object in a client application to provide "live" features through ML refresh on the client application.

Continuing with the above example, an author/administrator may grant no rights to the data of workbook 242 and grant an access right to a pivot table object to a first viewer and grant no access rights to a chart object to the first viewer. When the first viewer sends a request for objects associated with workbook 242, an identifier of the first viewer is compared to the objects. In the above example, the first viewer has no access to the data of workbook 242, the viewer has no access to the chart object, and the viewer has access to the pivot table object. In this manner, an author/administrator may publish objects of workbook 242 and tailor access rights to the objects according to the requesting viewer of the objects. The first viewer may associate the resource identifier of the pivot table object with a slide presentation application. The ML of the pivot table object is association with the slide presentation application. The viewer may, for example, pivot the pivot table object. The ML associated with the pivot table object is refreshed on the client application by a session identifier and communication between the hosted web render of the client application and application server 210. In one aspect, the rendering of the pivot table is pulled down from the server and is interactive but the data associated with the pivot table (e.g. any internal cashes, the data in the spread sheet, etc.) remains on the server and is not sent between the client and the server. In this manner, the viewer may interact with the pivot table object in the slide presentation object to provide "live" features through ML refresh on the client application.

Figure 3:
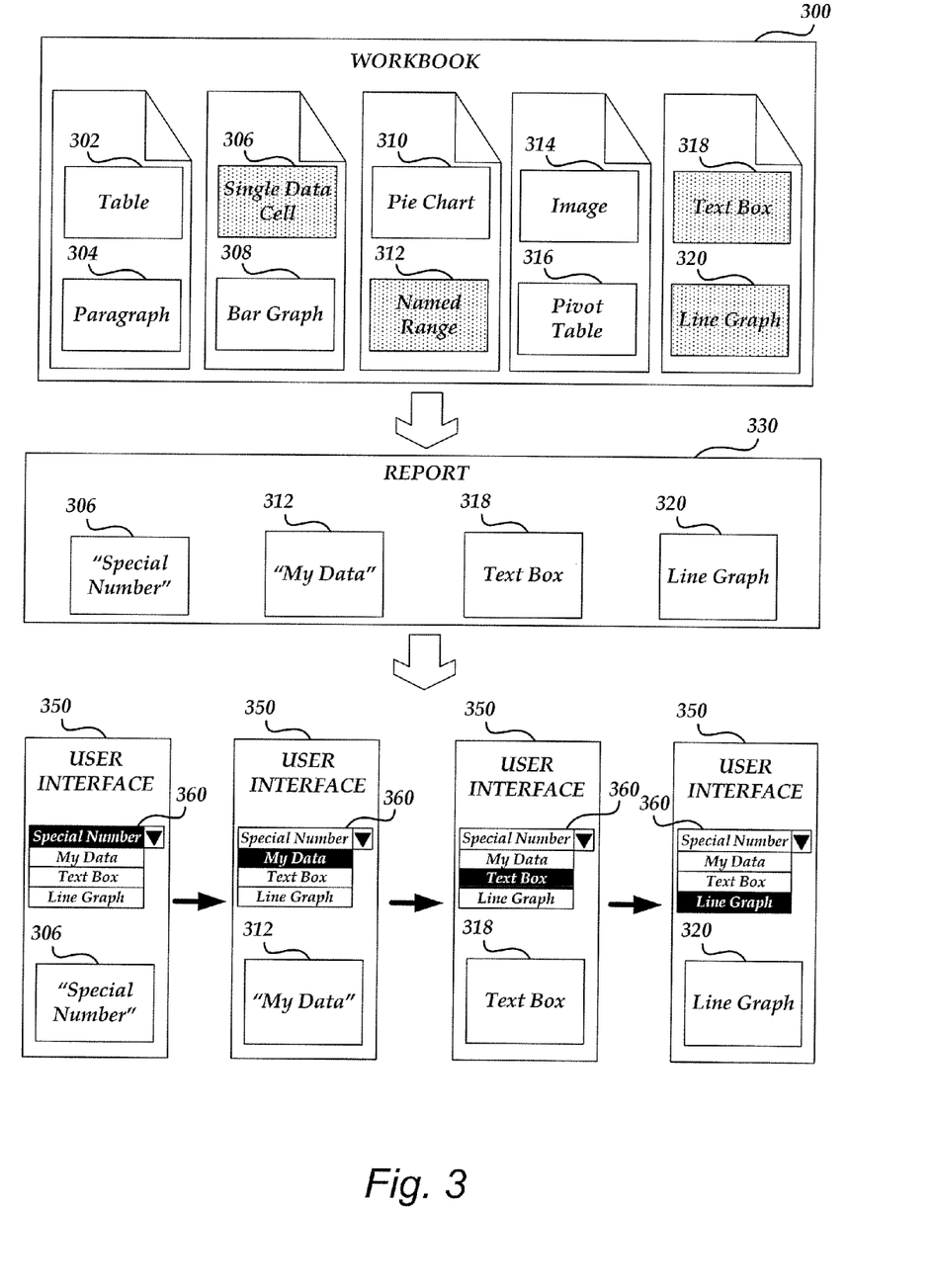
FIG. 3 is a functional block diagram illustrating the generation of a named object view of an electronic data report.

FIG. 3 is a functional block diagram illustrating the generation of a named object view of an electronic data report. The named object view of the report is generated from an electronic data file. As shown in the diagram, the electronic data file is a workbook 300 associated with a spreadsheet application. However, the electronic data file may be any file that may be associated with a report.

The workbook 300 includes multiple objects on different pages. The objects may be any item in the workbook 300 that can be individually selected or manipulated. For example, the objects may include a table 302, a paragraph 304, a single data cell 306, a bar graph 308, a pie chart 310, a named range 312, an image 314, a pivot table 316, a text box 318, and a line graph 320. In one embodiment, an object in the workbook 300 may be defined to encompass multiple smaller objects. For example, an object may correspond to multiple pages of the workbook 300. In another embodiment, an object may include dynamic information such that the size of the object changes over time. For example, the named range 312 may correspond to a range of cells in the workbook 300. The range of cells may increase or decrease in size in response to spreadsheet processing.

An author user or administrative user may access the workbook 300 from a server to generate a report 330. Alternatively, the workbook 300 may be accessed at a client. The user selects objects to publish in the report. For example, the user may select the single data cell 306, the named range 312, the text box 318, and the line graph 320 to appear in the report 330. The user may open the workbook 300 from a publisher interface. In one embodiment, names associated with the objects are provided in the publisher interface. The user may select the objects to publish from the list. In one embodiment, objects may be selected for publication from multiple workbooks.

Each object to be published is associated with a unique name. The user may select the objects for inclusion in the report 330 by name such that each published object may be easily identified. In one embodiment, the published object names may be automatically generated. For example, the table 302 may be automatically identified as "table", "table1", or some other unique name. The user may rename the automatically generated name. In another embodiment, the user defines a name for the published object. For example, the single cell data 306 may be defined as "special number". Likewise, the named range 312 may be defined as "my data".

The selected objects are published in the report 330. For example, the single data cell ("special number") 306, the named range ("my data") 312, the text box 318, and the line graph 320 are published in the report 330. The unselected portions of the workbook 300 are not published in the report 330.

A viewer at the client is presented with a named object view of the report 330. A report renderer converts the published objects into ML when the workbook 300 is accessed from a server. The ML version of the published objects is forwarded to a client for display via a web browser. In one embodiment, a published object is rendered on a user interface 350. For example, the user interface 350 may be a web part. A web part is a modular unit of information that has a single purpose. Web parts form the basic building blocks of many web pages. More than one web part may be simultaneously displayed on a dashboard at the client such that different published objects may be viewed side-by-side. For example, the viewer may select the text box 318 and the line graph 320 for display on different web parts because the text box 318 elaborates on data presented in the line graph 320.

A tool bar that includes the names of the published objects may also be rendered on the user interface 350. The tool bar may be used for accessing specific published objects. For example, the tool bar is a drop down menu 360 that includes a list of the names of the published objects. Specifically, the drop down menu 360 includes selectable entries for "special number", "my data", text box, and line graph. The named object view of the report is rendered on the user interface 350 with the first published object (i.e., "special number"). The other published objects may be rendered at the user interface 350 in response to user input. For example, the viewer may select an entry from the drop down menu 360 such that the user interface 350 refreshes and the published object corresponding to the selected entry is rendered on the user interface 350. Thus, each published object may be individually displayed to the viewer at the client. The named object view of the report focuses the viewer's attention on the published objects. The non-published objects of the workbook 300 are not displayed to the viewer.

Figure 4:
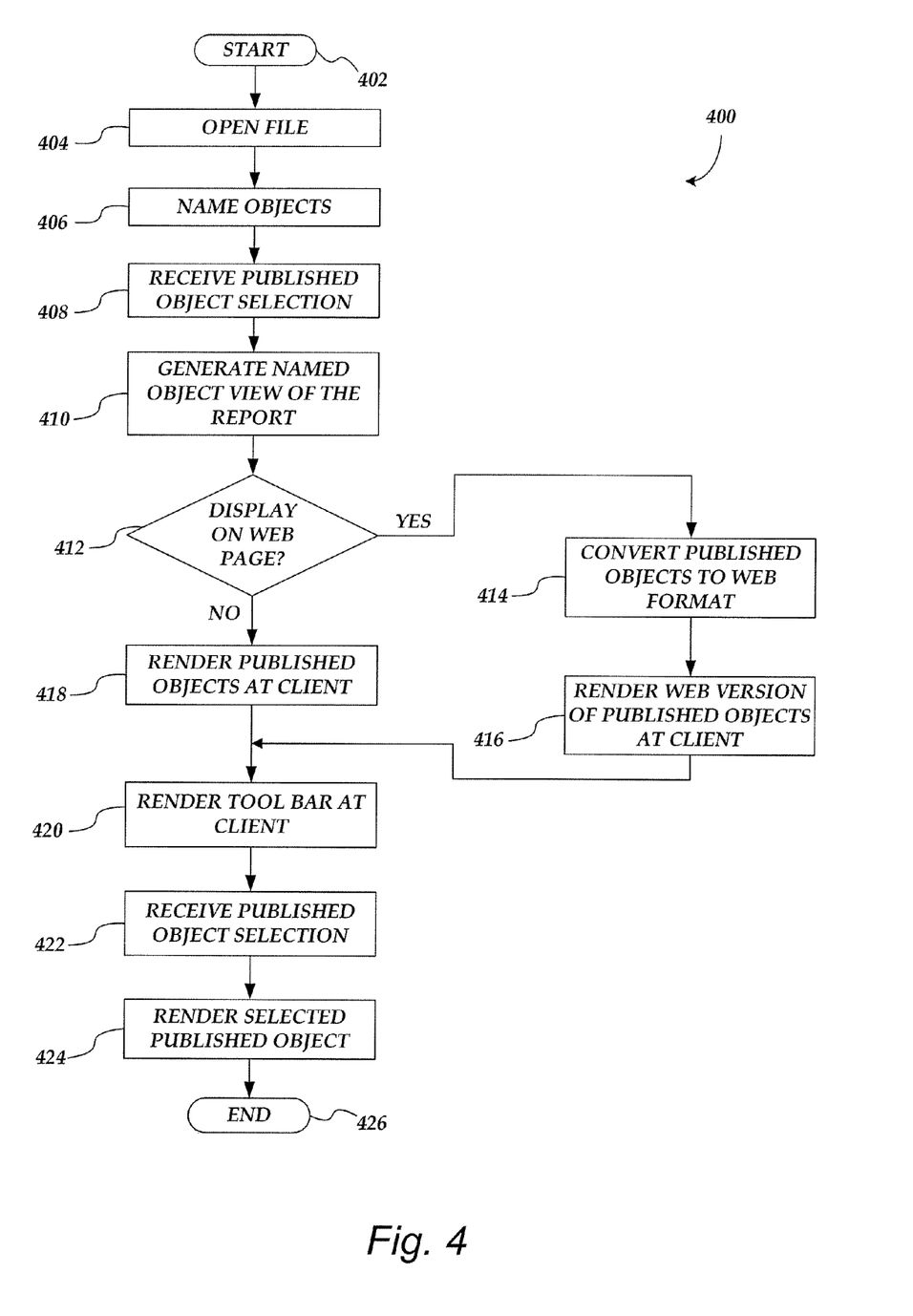
FIG. 4 is an operational flow diagram showing aspects for generating a named object view of an electronic data report.

FIG. 4 is an operational flow diagram showing aspects of generating a named object view of a report associated with electronic data. Operational flow 400 begins at start operation 402 where electronic data is stored as a file in a data store. A report of the file is created by a user and rendered to a viewer at a client as discussed in detail below.

The file is retrieved from the data store and opened at block 404. The file includes multiple objects. The objects may be any item in the file that can be individually selected or manipulated. The objects may be associated with static or dynamic information.

Moving to operation 406, the objects in the file are named. In one embodiment, an object is automatically assigned a name. For example, two images may be assigned the names "image1" and "image2" respectively. In another embodiment, the name of an object is user-defined. For example, a single cell or a named range in a spreadsheet file may be defined with a name that communicates meaning to the user. The name of any object may also be renamed by the user.

Transitioning to operation 408, a selection of objects to publish in the report is received. In one embodiment, the user selects the objects to publish from a list of the named objects. In another embodiment, the user may navigate the file and select each object to be published directly from the file. In yet another embodiment, the user may select the objects to publish from multiple files.

Proceeding to operation 410, the named object view of the report is generated using the published objects. Any objects in the file that are not selected for publication are not included in the report.

Continuing to decision operation 410, a determination is made whether the named object view of the report is to be displayed on a web page. The named object view of the report is displayed on a web page when the file is retrieved from the data store via a server, in which case processing proceeds to operation 414. The named object view of the report is not displayed on a web page when the file is retrieved from the data store at the client, in which case processing proceeds at operation 418.

Continuing to operation 414, a report renderer converts the published objects to a format suitable for display on a web page. For example, the report renderer may convert the published objects to ML. Advancing to operation 416, the web-formatted version of the published objects is rendered at the client for display by a web browser. A viewer at the client is presented with a named object view of the report. In one embodiment, the first published object is rendered on a web part. The user may navigate to the other published objects such that one published object at a time is rendered in the web part.

Proceeding to operation 418, the published objects are directly rendered at the client. A viewer at the client is presented with a named object view of the report. In one embodiment, the first published object is rendered in a user interface at the client. The user may navigate to the other published objects such that one published object at a time is rendered in the user interface.

Moving to operation 420, a tool bar is rendered at the client. The tool bar includes the names of the published objects such that the viewer may navigate to specific published objects. In one embodiment, the tool bar is a drop down menu of a list of the names of the published objects. The drop down menu is rendered in the web part or the user interface.

Transitioning to operation 422, a particular published object selection is received at the tool bar from the viewer. For example, the viewer may select a published object from the drop down menu. Proceeding to operation 424, the selected published object is rendered at the client. For example, the web part or the user interface refreshes in response to the viewer input such that the selected published object is displayed on the web part or the user interface. Thus, the viewer's attention is focused on the published objects in the report. The unpublished file data is not presented to the viewer and may be disregarded. Processing then terminates at end operation 426.

Figure 5:
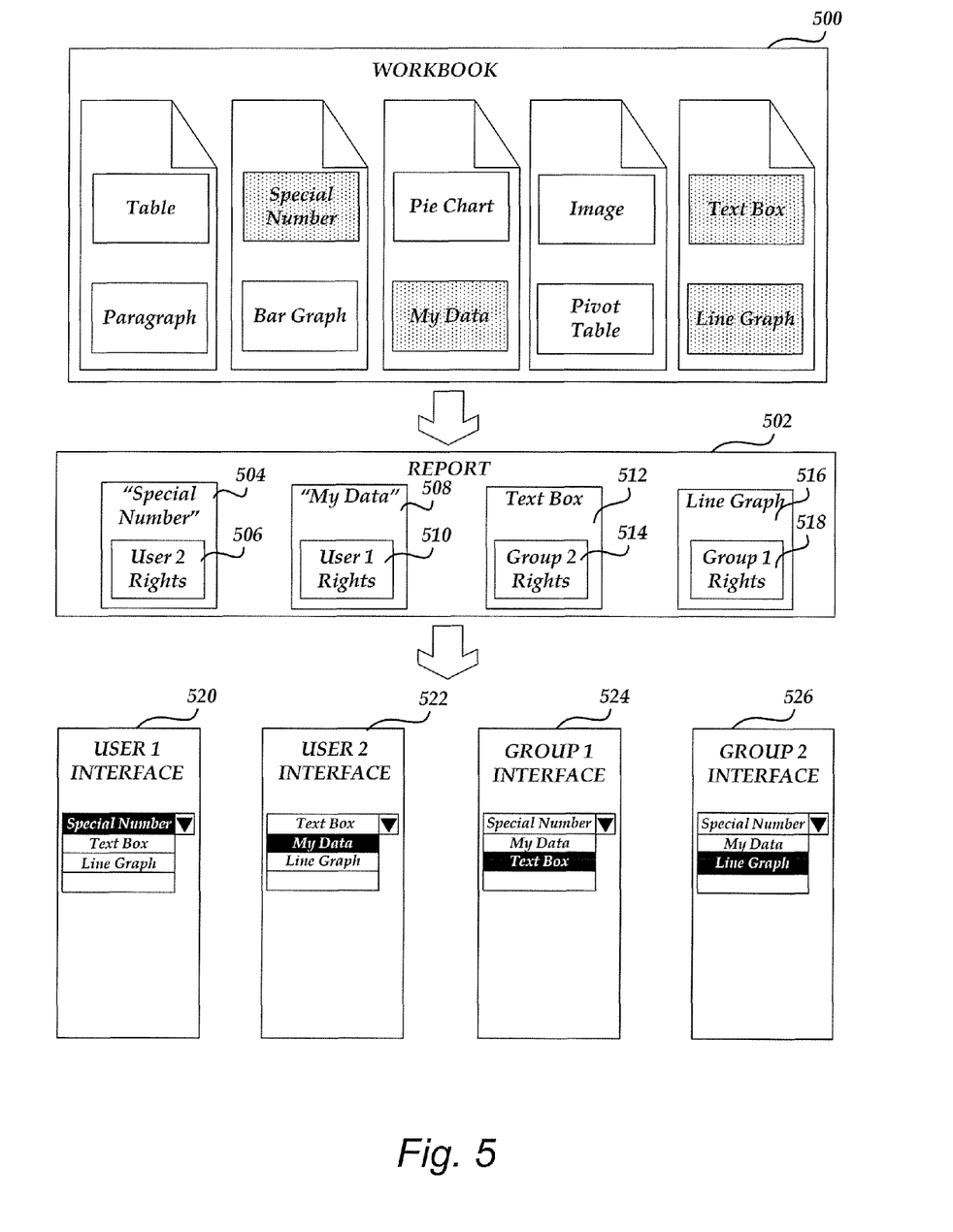
FIG. 5 is a functional block diagram illustrating the association of rights with the objects.

FIG. 5 is a functional block diagram illustrating the association of rights with the objects. The named object view of the report is generated from an electronic data file. As shown in the diagram, the electronic data file is a workbook 500 associated with a spreadsheet application. However, the electronic data file may be any file that may be associated with a report.

Workbook 500 includes multiple objects on different pages. Workbook 500 may also include rights associated with the objects as depicted in report 502. An author user or administrative user may access the workbook 500 from a server to generate a report 502. Alternatively, the workbook 500 may be accessed at a client. The user selects objects to publish in the report. The user may also associate rights with the objects. For example, as depicted in report 502, special number object 504 includes user 2 rights 506, my data object 508 includes user 1 rights 510, text box object 512 includes group 2 rights 514, and line graph object 516 includes group 1 rights 518. In this example, the rights are exclusive; however, the rights may also be inclusive rights and/or any other combination of rights to protect access to the objects.

The selected objects are published in the report 502 according to their respective rights. A viewer at the client is presented with a named object view of the report 502. A report renderer converts the published objects into ML when the workbook 500 is accessed from a server. The ML version of the published objects is forwarded to a client for display via a web browser according to the respective rights of the user. A tool bar that includes the names of the published objects may also be rendered on the user interfaces 520, 522, 524 and 526 according to the respective rights. The tool bar may be used for accessing specific published objects according to the rights. In the example associated with FIG. 5, the rights are exclusive. Accordingly, user 1 interface 520 does not have access to my data object 508 because user 1 rights 510 exclude such access, user two interface 522 does not have access to special number object 504 because user 2 rights 506 exclude such access, group 1 interface 524 does not have access to line graph object 516 because group 1 rights 518 excludes such access, and group 2 interface 526 does not have access to text box object 512 because group 2 rights 514 exclude such access. The rights may include any combination of exclusive and inclusive rights and are not limited by the example in FIG. 5.

Figure 6:
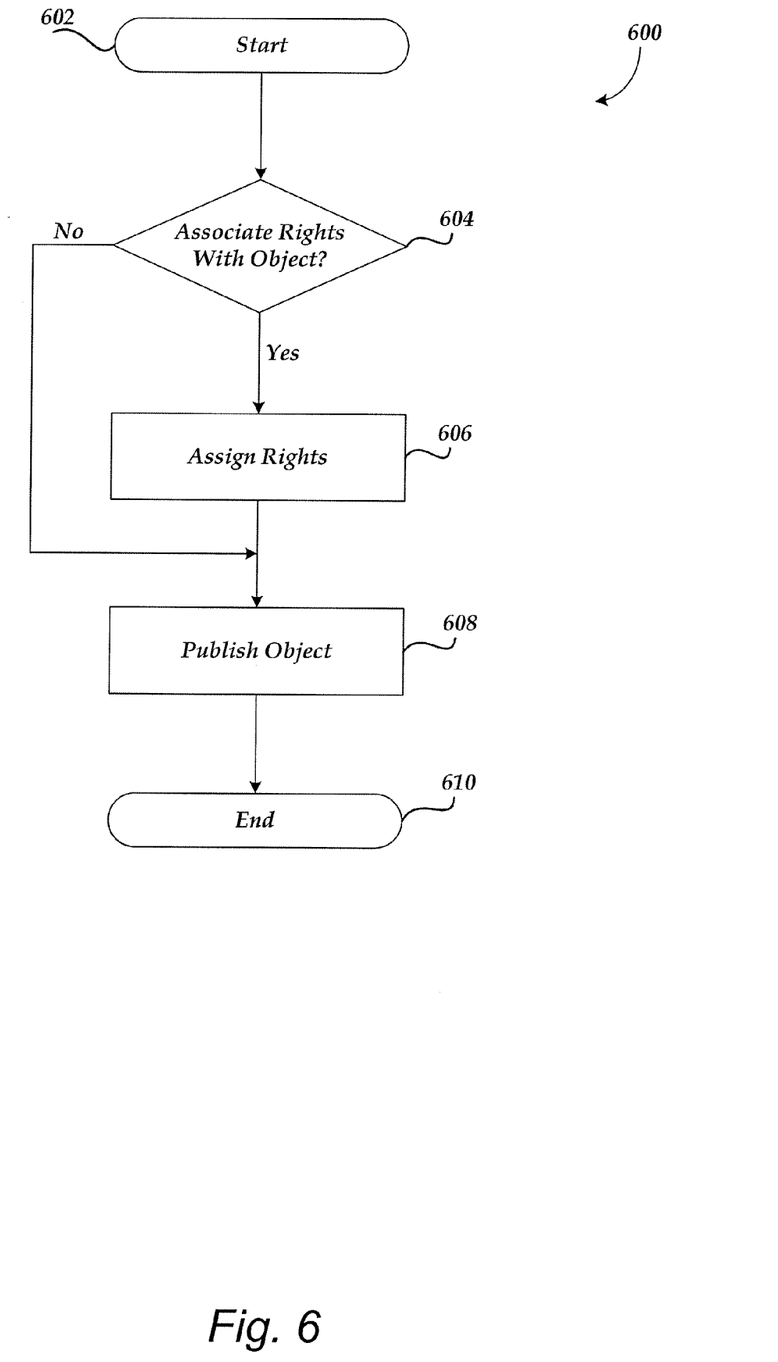
FIG. 6 is an operational flow diagram showing aspects for assigning rights to an object.

FIG. 6 is an operational flow diagram showing aspects of an illustrative process for assigning rights to an object. Operational flow 600 begins at start operation 602 and continues to decision operation 604 where a determination is made on whether to associate rights with an object. Rights may be automatically associated with an object or rights may be author determined. Different right may be associated with different objects of the same workbook.

If it is decided that rights are not to be associated with an object, operational flow 600 continues to operation 608. If it is decided that rights are to be assigned to an object, operational flow 600 continues to operation 606 where rights are associated with the object. As indicated above, the rights may be exclusive rights, inclusive rights or any other type of rights for protecting access to an object. In one aspect, the rights are indicated by an access level that is associated with a user identifier and/or a group identifier.

Operational flow 600 continues to operation 608 where the objects are published according to their respective security rights. Operational flow 600 ends at end operation 610.

Figure 7:
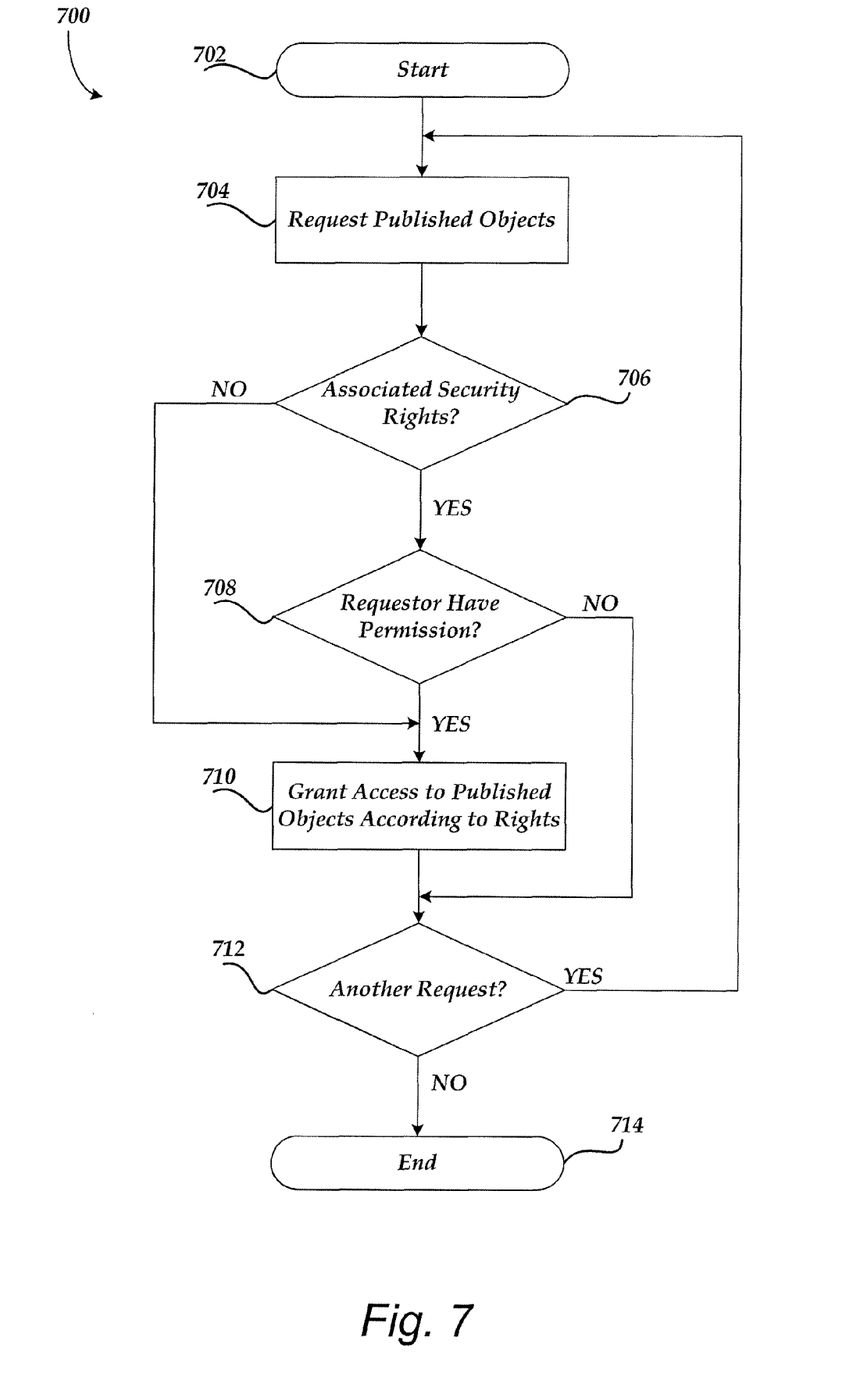
FIG. 7 is an operational flow diagram showing aspects for granting or denying rights to an object.

FIG. 7 is an operational flow diagram for granting or denying rights to an object. Operational flow 700 begins at start operation 702 and continues to operation 704 where a request for published objects is received. The request may be received from a viewer association with a client. In one aspect, the request includes a user identifier, a group identifier or any other type of identifier that identifies a viewer that is attempting to access the published objects.

Operational flow 700 continues to decision operation 706 where it is determined whether the requested published objects have associated security rights. If not, operational flow 700 continues to operation 710 as discussed below. If requested published objects have associated security rights, operational flow 700 continues to decision operation 708.

At decision operation 708, it is decided whether the requestor has rights to the objects. In one aspect, a user or group identifier of the requesting viewer is compared to an identifier and permissions associated with the object. For example, the object may include a user identifier and a right associated with the user identifier. When a user identifier is received with the request and matches the user identifier associated with the object, the user is granted or denied access according to the right associated with the object. If the requester does not have permission to access the object, operational flow 700 continues from decision operation 708 to operation 712 as discussed below. If the requester has permission to access the object, operational flow 700 continues to operation 710 where access is granted to the object.

Once access is either granted or denied, operational flow 700 continues to decision operation 712 where it is determined if another request has been received. If so, operational flow 700 loops back to operation 704. If not, operational flow 700 continues to end operation 714.

Based on the foregoing, it should be appreciated that the various embodiments include a method, system, apparatus, and computer-readable medium for generating a named object view of a report associated with electronic data. The above specification, examples and data provide a complete description of the manufacture and use of the composition.

What is claimed is:

1. A computer-implemented method for generating a report associated with a named object view according to an access right, the method comprising; receiving a request for the report, wherein the request includes a user identifier; obtaining a file associated with the requested report, wherein the file includes objects that are individually selectable and each comprise an access right that is configurable for each object within the file, wherein the access right for at least one of the objects is different from an access right for the data that the at least one of the objects is generated from; opening the file that includes the objects; determining from the objects in the file each object that is identified for publication;

comparing the user identifier of the request with the access right associated with each object that is identified for publication to determine whether the object is accessible; generating the report with each of the accessible objects; and rendering a graphical user interface at a client that displays a single published object from the report at a time and includes a user interface element that when selected displays a list of the accessible objects within the report and is used for receiving a selection of an object from the list of the accessible objects and in response to receiving the selection replacing the display of the single published object with the selected object.

2. The computer-implemented method of claim 1, wherein the access right is below a file level security right such that an access right to the file is different from access rights to individual objects within the file.

3. The computer-implemented method of claim 1, wherein the access right is an inclusive access right.

4. The computer-implemented method of claim 1, wherein the access right is an exclusive access right.

5. The computer-implemented method of claim 1, wherein the access right is at least one member of a group comprising: a view access right, no access right, a read access right, a write access right, and an edit access right.

6. The computer-implemented method of claim 1, wherein the user identifier is a group identifier.

7. The computer-implemented method of claim 1, further comprising associating a link of the accessible object with a client application having a hosted web render, wherein a mark-up language ("ML") associated with the accessible object is refreshed on the client application upon interaction with the accessible object in the client application.

8. The computer-implemented method of claim 1, wherein the requested report includes a plurality of objects for publication having different access rights.

9. The computer-implemented method of claim 1, wherein the access right associated with the object for publication is different than an access right associated with data of the file for generating the object for publication.

10. A system for generating a named object view of a report associated with a file, the system comprising:
- a client, wherein a request for the report is generated at the client, wherein the request includes a user identifier;
- a data store, wherein the file associated with the requested report is stored in the data store; and
- a server coupled to the client and the data store, wherein the server is arranged to:
  - receive the request for the report, wherein the request includes the user identifier;
  - obtain a file associated with the requested report, wherein the file comprises objects;
  - determine from the file an object for publication;
  - compare the user identifier of the request with an access right associated with only the object for publication to determine whether the object is accessible;
  - generate the report with the accessible object; and
  - render the report with the accessible object at a client; and
  - render a graphical user interface at the client that includes a user interface element that when selected displays a list comprising the accessible object and is used for accessing the accessible object.

11. The system of claim 10, wherein the access right is below a file level security right.

12. The system of claim 10, wherein the access right is at least one member of a group comprising: an exclusive access right and an inclusive access right.

13. The system of claim 10, wherein the access right is at least one member of a group comprising: a view access right, no access right, a read access right, a write access right, and an edit access right.

14. The system of claim 10, wherein the user identifier is a group identifier.

15. The system of claim 10, further comprising the client being configured to associate a link of the accessible object with a client application having a hosted web render, wherein a mark-up language ("ML") associated with the accessible object is refreshed on the client application upon interaction with the accessible object in the client application.

16. The system of claim 10, wherein the requested report includes a plurality of objects for publication having different access rights.

17. The system of claim 10, wherein the access right associated with the object for publication is different than an access right associated with data of the file for generating the object for publication.

18. A computer-readable storage medium that is not a signal having computer-executable instructions stored thereon which, when executed by a computer, will cause the computer to perform a method for generating a named object view of a report associated with a file, the method comprising:
- receiving a request for the report, wherein the request includes a user identifier;
- obtaining a file associated with the requested report, wherein the file comprises objects;
- wherein an access right for at least one of the objects is different from an access right for data from which the object is generated;
- determining from an examination of the file an object for publication;
- comparing the user identifier of the request with an access right specified for the object for publication to determine whether the object is accessible;
- generating the report with the accessible object; and
- rendering the report with the accessible object at a client and displaying a graphical user interface at the client that includes a user interface element that when selected displays a list comprising the accessible object.

19. The computer-readable storage medium of claim 18, further comprising associating a link of the accessible object with a client application having a hosted web render, wherein ML associated with the accessible object is refreshed on the client application upon interaction with the accessible object in the client application.

20. The computer-readable storage medium of claim 18, wherein the access right associated with the object for publication is different than an access right associated with data of the file for generating the object for publication.

* * * * *